(12) United States Patent
Yehuda et al.

(10) Patent No.: US 8,621,550 B1
(45) Date of Patent: Dec. 31, 2013

(54) INFORMATION TECHNOLOGY RESOURCE COMPLIANCE TEMPLATES

(75) Inventors: Hanna Yehuda, Newton, MA (US);
Daniel C. Lanzi, Wilton, CT (US);
Oran Epelbaum, Tel Aviv (IL); Frank Murphy, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1507 days.

(21) Appl. No.: 11/863,885

(22) Filed: Sep. 28, 2007

(51) Int. Cl.
*G06F 21/00* (2013.01)

(52) U.S. Cl.
USPC ............... 726/1; 713/168; 713/193; 455/466; 709/226; 709/227; 705/7; 705/37

(58) Field of Classification Search
USPC ............................................................. 726/1
See application file for complete search history.

(56) References Cited

U.S. PATENT DOCUMENTS

| | | | |
|---|---|---|---|
| 7,512,965 B1* | 3/2009 | Amdur et al. .................... 726/1 |
| 7,757,271 B2* | 7/2010 | Amdur et al. .................... 726/1 |
| 8,024,171 B1* | 9/2011 | Korolev ........................ 703/24 |
| 8,037,004 B2* | 10/2011 | Rajkumar et al. ............. 706/47 |
| 2005/0177635 A1* | 8/2005 | Schmidt et al. ............... 709/226 |
| 2006/0218513 A1* | 9/2006 | Dozorets et al. ................ 716/5 |
| 2007/0078988 A1* | 4/2007 | Miloushev et al. ........... 709/227 |
| 2007/0156659 A1* | 7/2007 | Lim ................................... 707/3 |
| 2007/0157287 A1* | 7/2007 | Lim ................................... 726/1 |
| 2008/0126070 A1* | 5/2008 | Copty et al. ..................... 703/22 |
| 2008/0270973 A1* | 10/2008 | Edwards et al. .............. 717/104 |
| 2009/0077621 A1* | 3/2009 | Lang et al. ........................ 726/1 |
| 2009/0276771 A1* | 11/2009 | Nickolov et al. ............. 717/177 |

OTHER PUBLICATIONS

Technical Guide to Information Security Testing and Assessment|http://csrc.nist.gov/publications/nistpubs/800-115/SP800-115.pdf|Scarfone et al.|Sep. 2008↑pp. 1-80.*

* cited by examiner

*Primary Examiner* — Mahfuzur Rahman
(74) *Attorney, Agent, or Firm* — Krishnendu Gupta; Gerald P. Kazanjian

(57) ABSTRACT

A compliance manager presents a set of selectable compliance tests (e.g., templates) in a graphical user interface. For example, each compliance test has a unique configuration operable for evaluating data associated with Information Technology "IT" resources. In particular, the compliance tests can include policy and/or rule templates for use in creating targeted compliance testing of IT resources. During operation, the compliance manager receives a selection of a compliance test (e.g., from a network administrator). The compliance manager additionally enables modification of a configuration associated with the compliance test. In turn, the compliance manager applies the compliance test (along with any modifications) to the data associated with the IT resources.

20 Claims, 9 Drawing Sheets

305

- 310 — Description: Protects health insurance coverage for workers when they change of lose their jobs. Governs uses and disclosures of individual's health data.
- 315 — Policy Scope: Miami
- Compliance Statement: Policy is non-compliant if there are at least 1 critical rule violation — 320
- 325 — Notification: Notify by e-mail to yehuda_hanna@emc.com when policy is not compliant
  Notify by e-mail to lanzi_dan@emc.com when
- 330 — Permissions: View policy only - SAP Policy Officer, ENG Policy Officer
  View policy and Acknowledge violations roles - Operator
- Creation Date: 2007-03-01 13:00(GMT+01:00) — 335
- Last Updated Date: 2007-03-20 12:00(GMT+01:00) — 340

Rules Details (15)
                                                                                                       ↙ 345

| Rule Name | Rule Description | Rule Summary |
|---|---|---|
| Oracle servers in Seattle | Check that the Oracle servers in Seattle don't have floppy drives | Check that Service name Oracle in Group Seattle have Count(storageDevice.floppy) = 0 |
| No specific connections in Miami | Check that there are no connections using ports 80, 443 or 8080 on Windows 2003 File Servers in Miami<br>355 | Check that Services where OS is Windows Server 2003 runs on File Server runs on ports (80 OR 443 OR 8080) in Group Miami<br>Does not exist.<br>360 |
| DNS server in Chicago | Check that there's at least one name | Check that service name DNS |

INFORMATION TECHNOLOGY RESOURCE COMPLIANCE TEMPLATES

RELATED APPLICATIONS

This application is related to co-pending U.S. patent application Ser. No. 11/769,407 entitled "POLICY BASED NETWORK COMPLIANCE," and co-pending U.S. patent application Ser. No. 11/769,499 entitled "RULE-BASED NETWORK RESOURCE COMPLIANCE," the entire teachings of both of which are incorporated herein by this reference.

BACKGROUND

In a configured information network, such as a managed information network, a network fabric, or infrastructure, interconnects network elements, or nodes, for providing various services to end users that are also connected to the network. In a managed information infrastructure, for example, a number of network element nodes contain various instances of installed software applications which are adapted to provide Information Technology "IT" services to the users. Further, each service may include a series of dependencies on other services or other nodes in the infrastructure. The collection of elements defines a configuration of the information network that is often updated to respond to changes in the network, such as for performance improvements, message traffic redirection, and equipment failures.

In a typical information network, the number of interconnected elements can become large, resulting in a substantial number of relationships between the network elements (nodes), the network connections between them, and the application that execute on them. Accordingly, a set of rules may be implemented to identify good or mandatory practices in the network, such as providing a redundant link between critical nodes, or always deploying application A on a node with application B, for example. This set of rules defines a policy that network administrators enforce to maintain the network in a predictable and manageable state. However, identifying and verifying each of the rules across the network may become cumbersome in a large network. Further, the policy including the rules may be driven by external factors, such as corporate directives, security requirements, industry best practices, and Federal compliance laws. Therefore, at any particular site or enterprise, there may be multiple policies to be satisfied, each having a multiplicity of rules in effect.

SUMMARY

Conventional rule management applications such as those as discussed above suffer from a number of deficiencies. For example, although conventional rule management tools can be used to manage a set of policies and rules and test for compliancy as mentioned above, use of conventional policy and rule management systems can be quite tedious and time-consuming, especially when used to manage large groups of resources.

Techniques discussed herein deviate with respect to conventional applications such as those discussed above as well as techniques known in the prior art. For example, embodiments herein provide a novel and useful way for managing compliance policies and rules by utilizing predefined, modifiable and/or searchable templates, such as in a graphical user interface.

More specifically, embodiments herein enable a user (e.g., network administrator) to save policies and corresponding rules as modifiable templates for use in creating and developing future policies and rules. As a result, a user does not have to "re-invent the wheel" and start from scratch when developing or creating new policies and/or rules. Instead, embodiments herein enable a user to search for policy or rule templates having similar attributes to a desired policy or rule that the user intends to create. Thus, a resultant advantage derived from embodiments herein involves a user's ability to modify a particular policy/rule template in order to fine-tune that template according to a desired policy or rule regime. Furthermore, the user can then save the modified template as an additional template which can be accessible for future use cases.

In one embodiment, a compliance manager presents a set of selectable compliance tests (e.g., policy or rule templates) in a graphical user interface. As such, each compliance test has a unique configuration which can be used to evaluate data associated with network resources (e.g., Information Technology "IT" infrastructure resources such as host resources, connections, services, etc.). During operation, the compliance manager receives a selection of a compliance test (e.g., from a network administrator). According to one embodiment, the compliance manager also enables modification of a configuration associated with the compliance test (e.g., the addition of a rule to a predefined policy template). In turn, the compliance manager applies the compliance test (along with any modifications) to the data associated with the network, or IT infrastructure, resources.

As an example, the compliance manager presents a set of policy templates in the graphical user interface. In this manner, each policy template has a unique policy configuration that defines at least one of: i) a set of rules and corresponding violation criteria for rules within the set of rules; ii) a policy scope that indicates what resources from an Information Technology "IT" infrastructure the rules in the policy are to be applied; and iii) a policy compliance statement that defines a set of rule violations of varying severity that determine overall policy violation.

As another example, the compliance manager presents a set of rule templates in the graphical user interface. Accordingly, each rule template has a unique rule configuration that defines at least one of: i) a rule scope definition; and ii) a selection of compliance conditions that define desired states to be applied to the data associated with the network (e.g., IT infrastructure) resources as specified by the rule scope definition.

For example, in order to facilitate ease of use in an IT infrastructure requiring voluminous amounts of compliance policies and rules, the compliance manager enables the policy and/or rule templates to be searched according to a set of queryable attributes (e.g., searchable parameters) associated with each rule and/or rule template in a database. In response to receiving a selection of a queryable attribute (e.g., rule name, policy scope, etc.), the compliance manager retrieves requested policy and/or rule templates, if any, having the queryable attribute from the database. Additionally, if at least one requested policy and/or rule template is retrieved, the compliance manager selectively displays the requested policy and/or rule template(s) in the graphical user interface in accordance with one example embodiment.

In one embodiment, in response to receiving a selection of a specific policy or rule template, the compliance manager provides a preview of the respective policy or rule template. For example, a preview of a policy template (e.g., in a preview pane in the same graphical user interface) can include information such as, but not limited to, the policy scope, the associated set of rules, the policy compliance statement, etc. On the other hand, a preview of a rule template (e.g., in a preview pane) can include information such as, but not limited to, the rule scope, the associated rule compliance conditions, the rule severity, etc.

Note that embodiments disclosed herein include any type of computerized device, workstation, handheld or laptop computer, or the like configured with software and/or circuitry (e.g., a processor) to process any or all of the method operations disclosed herein. In other words, embodiments herein can include a computerized device such as a computer or a data communications device or any type of processor that is programmed or configured to provide rule management functions as explained herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

In addition to the embodiments discussed above, other embodiments herein include a computerized device (e.g., a host computer, workstation, etc.) configured to support the techniques disclosed herein such as management of compliance policies and corresponding rules. In such embodiments, a computer environment to carry out the invention includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports compliance management according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support rule management and related functions according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

As an example, a more particular technique of the present disclosure is directed to a computer program product or computer environment that includes a computer readable medium having instructions stored thereon to facilitate rule management functions. The instructions and corresponding execution support operations of: i) presenting a set of selectable compliance tests in a graphical user interface, wherein each compliance test has a unique configuration operable for evaluating data associated with the network resources; ii) receiving a selection of a compliance test; iii) enabling modification of a configuration associated with the compliance test; and iv) applying the compliance test including modification to the configuration of the compliance test, if any, to the data associated with the network resources.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

Techniques herein are well suited for use in applications such as those supporting policy and/or rule management in a network environment. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 is an example screenshot illustrating a graphical user interface enabling a user to preview details of a policy template according to embodiments herein.

DETAILED DESCRIPTION

Figure 1:
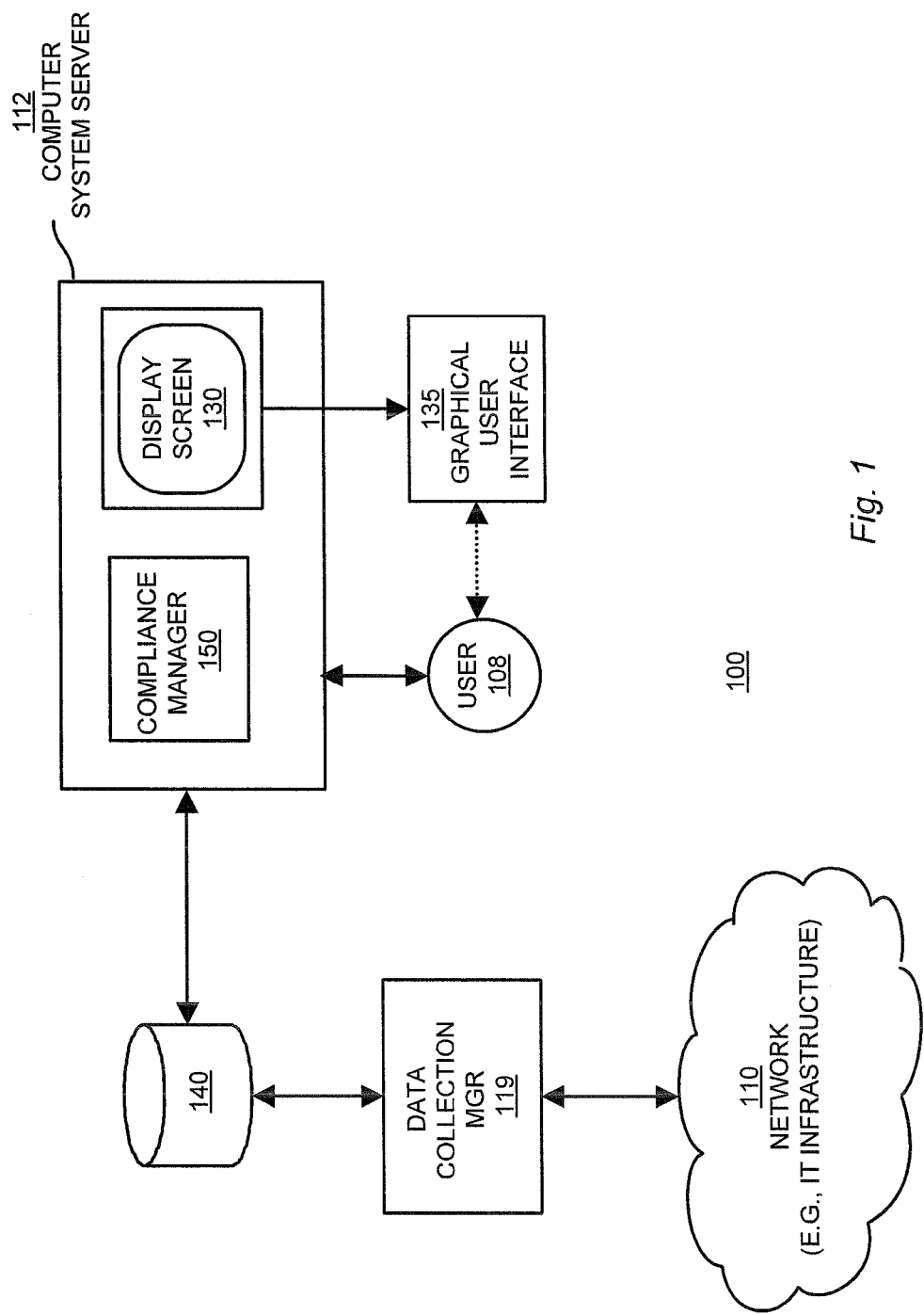
FIG. 1 is an example diagram illustrating collection of resource data and use of a compliance manager according to embodiments herein.

FIG. 1 is an example diagram illustrating collection of resource data and use of a compliance manager 150 and related functions according to embodiments herein. As shown, the communication environment 100 includes network 110, data collection manager 119, repository 140, computer system 112, display screen 130, compliance manager 150, and user 108. Further, a network as defined herein refers to an Information Technology "IT" infrastructure, and may encompass various systems such as Internet Protocol "IP" networks, storage arrays, servers and distributed applications, and is not intended to be limited to a conventional set of IP conversant switching devices.

As its name suggests, data collection manager 119 collects data (e.g., network resource information, IT infrastructure resource information, etc.) from resources, services, processes, switch applications, etc. operating and/or present in network 110. Network 110 can include one or more networks of sub-resources having data collected by data collection manager 119. Data collection manager 119 can be configured to collect information in many different ways. For example, the data collection manager 119 can initiate direct queries to resources in respective network 110. Queries can include requests for configuration data associated with a queried resource. Responses to queries can include data such as version information associated with a particular application, vendor information, etc. associated with a queried resource. Data collection manager 119 then stores the received information in the repository 140 for application of compliance policies and corresponding rules. As will be discussed further below, such compliance policies and corresponding rules may be stored as modifiable templates to be applied to resource data in future use cases.

In a particular configuration, the data collection manager 119 analyzes the collected data and stores the information as objects in a repository 140 (e.g., a database or other storage device). Each object in the repository includes information associated with a respective resource in the network 110. Storage of the collected information (and/or other derived information) can include classifying the information in one of three classes such as whether the resource information is associated with a host resource, a connection, or service in network 110. This classification is only one example and can be extended to any number of classes, sub-classes, etc.

As an example of an embodiment herein, the network 110 can include resources such as clients, servers, switches, storage devices, host resource, connections supporting communications between computer systems, services, etc. in network 110. A network resource such as a client resource (e.g., a computer system) can be classified as a host resource. The computer system server 112 can support a number of applications such as an operating systems, text editor applications, e-mail applications, etc. Upon collection of data associated with the sub-resources (e.g., operating system, text editors applications, etc.), the data collection manager stores 120 stores the information in objects. Each object (e.g., representing a resource or sub-resource) in the repository 140 includes information about the resource such as software version information, vendor information, computer system on which the application operates, etc.

Via retrieval of resource data in repository 140, the compliance manager 150 applies policies and corresponding rules to verify compliancy. More notably, the compliance manager can retrieve (e.g., from a compliance test database) predefined policies and/or rules which can be applied to the resource data in order to verify compliancy. Retrieval can be achieved via queries (e.g., SQL queries) applied to the compliance test database. In one embodiment, the compliance test database resides within repository 140.

As will be discussed later in this specification, via a graphical user interface on display screen 130, the compliance manager 150 enables a respective user to create policies and corresponding rules to verify compliance with respect to resource configurations (e.g., based on information stored in repository 140 from the direct and indirect queries) as well verify compliance with respect to two or more resources that communicate with each other over network 110 (e.g., based on message information transmitted between resources). Furthermore, the compliance manager 150 enables a respective user to store those policies and corresponding rules as modifiable templates. Thus, such policy and/or rule templates mitigate the need to "re-invent the wheel" and start from scratch when creating new policies and/or rules.

Accordingly, a particular configuration disclosed herein includes applying a rule (e.g., that has been retrieved as a predefined rule template) to a repository of message data (passively or actively) collected from multiple application resources communicating with each other over the network 110. Based on a comparison of compliance conditions (i.e. test of the desired state portion of a rule) to portions of the repository of message data as specified by the rule scope definition, the compliance manager 150 identifies or determines compliancy with respect to the communicating application resources.

Figure 2:
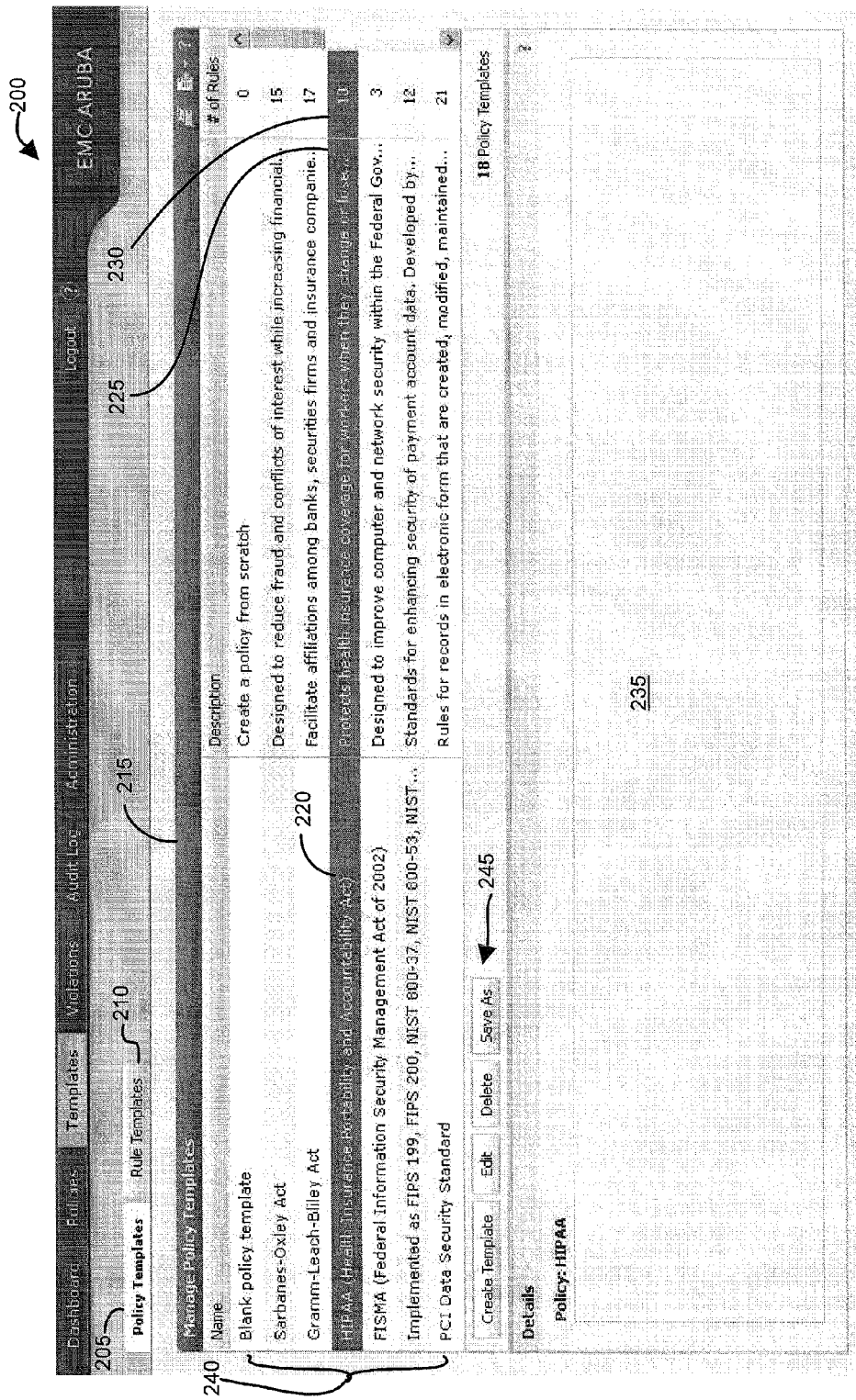
FIG. 2 is an example screenshot illustrating a graphical user interface enabling selection of different compliance policy templates according to embodiments herein.

FIG. 2 is an example screenshot 200 illustrating a graphical user interface (e.g., graphical user interface 135 as shown in FIG. 1) enabling a user to select a policy template for creating a compliance policy to be applied to resource data in a network.

For example, screenshot 200 includes a policy template tab 205 and a rule template tab 210. Also shown is a manage policy templates window 215 that has a policy name column 220, a policy description column 225 and number of rules column 230. Below the manage policy templates window 215 is a policy preview window 235, which is discussed further below in reference to FIG. 3.

By engaging (e.g., clicking with a mouse) the policy template tab 205, the compliance manager 150 displays the manage policy templates window 215 and corresponding policy preview window 235 in the graphical user interface 135. The manage policy templates window 215 provides an enumeration of selectable policy templates 240 that are available for interaction by a user. In the example embodiment of FIG. 2, the "Health Insurance Portability and Accountability Act" (HIPAA) policy template is highlighted to indicate that a user has tentatively selected that particular policy in the graphical user interface 135.

As will be discussed further below with respect to flowchart 700 in FIG. 7, the compliance manager 150 can provide a means for searching available policy templates by entering one or more queryable attributes (e.g., policy attributes or parameters that are able to be searched by the compliance manager 150). For example, a user can search for all policies having a scope (e.g., a queryable attribute) associated with "Accounting". As a result, the compliance manager 150 would retrieve and display (in manage policy templates window 215) any policy templates having a scope associated with "Accounting".

Note that a user tentatively selects a policy template in the manage policy templates window 215 by engaging the particular policy (e.g., with a mouse click) in any of the three columns associated with the policy (e.g., policy name column 220, policy description column 225, number of rules column 230, etc.). The selection of the particular policy template is tentative because the user has not engaged one of the action buttons 245 which would fully commit the user to interact with that particular policy. Having tentatively selected the HIPAA policy template, a user may interact with that particular policy by engaging one of the action buttons 245 (e.g., create template, edit, delete, save as). As their names suggest, a user may create a new template, edit an existing template, delete an existing template, or save a new template (e.g., save as) from any one of the enumerated policy templates displayed in the manage policy templates window 215 by engaging (e.g., clicking with a mouse) one of the respective action buttons 245.

For example, a user may engage the "Edit" action button 245 in order to edit or modify the existing HIPAA policy template. Assume, for example, that a user edits the HIPAA policy template by adding a rule (as will be discussed further below in reference to FIG. 4), resulting in a modified version of the HIPAA policy. The user can then save that modified HIPAA policy as a new policy for use by the compliance manager 150 by engaging the "Save As" action button 245 (e.g., and provide a new name for the policy if necessary). In another embodiment, the user can utilize the modified HIPAA policy to create a new template by engaging the "Create Template" action button 245. By doing so, the new template will be included in the manage policy templates window 215 as a pre-existing policy selectively available to a user of the compliance manager 150.

The policy preview window 235 provides details of the highlighted policy so that a user can become familiar with a particular policy. In other words, the policy preview window 235 provides details of the policy which has been tentatively selected in the manage policy template window 215, such as the HIPAA policy template shown in FIG. 2. When a user tentatively selects a different policy template in the manage policy templates window 215, the compliance manager 150 displays respective details of the different policy in the policy preview window 235. Details of the policy preview window 235 are discussed further below with reference to FIG. 3.

FIG. 3 is an example screenshot 300 illustrating a graphical user interface (e.g., graphical user interface 135 as shown in FIG. 1) that represents content in a policy preview window 305 (e.g., policy preview window 235 in FIG. 2).

As shown in the example configuration of FIG. 3, the policy preview window 305 provides a number of descriptors including a policy descriptor 310 (e.g., general overview of the policy), a policy scope 315 (e.g., proximal scope, logical unit scope, etc.), a compliance statement 320, a notification descriptor 325 (e.g., notify via email to a particular recipient), a permissions descriptor 330, a creation date 335, and a last used date 340. It should be noted that these descriptors do not form an exhaustive list and represent only one example configuration. As such, it is contemplated that fewer or more descriptors may also be provided in the policy preview window 305 according to example embodiments described herein.

Recall that a compliance policy includes a corresponding set of rules that are applied to resource data in order to verify network resource compliancy. In the same vein, FIG. 3 further depicts corresponding rules for a particular policy template in a rule details window 345. Note that the rule details window further includes a rule name column 350, a rule description column 355, and a rule summary column 360. Thus, a user can preview the set of rules associated with a policy template when tentatively selecting that policy template in the manage policy templates window 215 (see FIG. 2).

Figure 4:
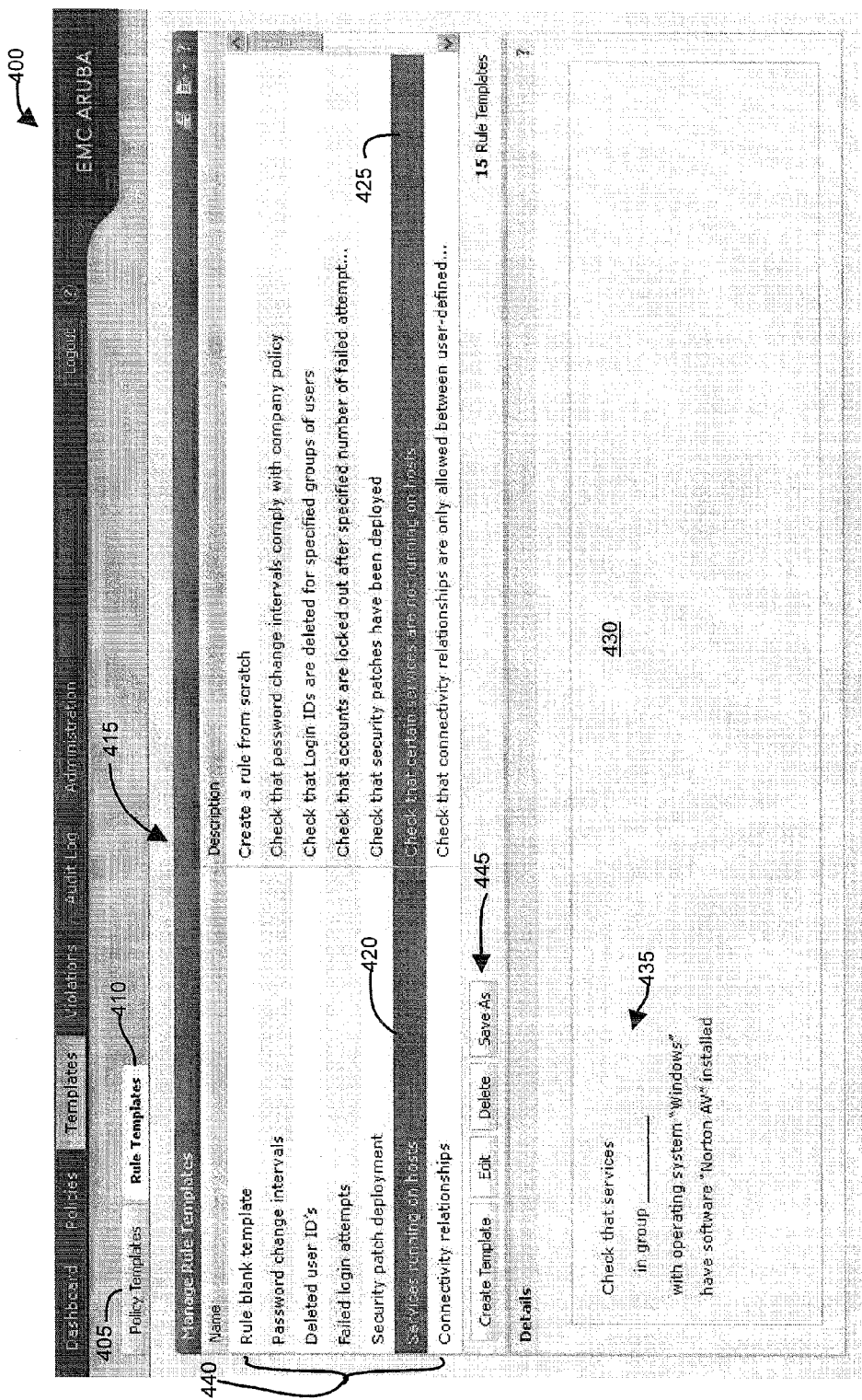
FIG. 4 is an example screenshot illustrating a graphical user interface enabling selection of different compliance rule templates according to embodiments herein.

FIG. 4 is an example screenshot 400 illustrating a graphical user interface (e.g., graphical user interface 135 as shown in FIG. 1) enabling a user to select a rule template for creating a compliance rule to be applied to resource data.

For example, screenshot 400 includes a policy template tab 405 and a rule template tab 410. Also shown is a manage rule templates window 415 that has a rule name column 420 and a rule description column 425. Below the manage rule templates window 415 is a rule preview window 430 which is similar to the policy preview window previously discussed in reference to FIGS. 2 and 3.

By engaging (e.g., clicking with a mouse) the rule template tab 410, the compliance manager 150 displays the manage rule templates window 415 and corresponding rule preview window 430 in the graphical user interface 135. The manage rule templates window 415 provides an enumeration of rule templates 440 that are selectively available for interaction by a user. In the example embodiment of FIG. 4, the "Services running on hosts" rule (hereinafter referred to as the Services rule) is highlighted to indicate that a user has tentatively selected that particular rule in the graphical user interface 135.

As will be discussed further below with respect to flowchart 800 in FIG. 8, the compliance manager 150 can provide a means for searching available rule templates by entering one or more queryable attributes (e.g., rule attributes or parameters that are able to be searched by the compliance manager 150). For example, a user can search for all rules having a scope (e.g., a queryable attribute) associated with "Unix servers". As a result, the compliance manager 150 would retrieve and display (in the manage rule templates window 415) any rule templates having a scope associated with "Unix servers".

Similar to the functionality discussed above, FIG. 4 shows that a user has tentatively selected a rule template (e.g., Server rule) in the manage rule templates window 415 by engaging the particular rule (e.g., via a mouse click) in any of the two columns associated with the rule (e.g., rule name column 420, rule description column 425, etc.). Likewise, the selection of the particular rule template is tentative because the user has not engaged one of the action buttons 445 which would fully commit the user to interact with that particular rule.

Having tentatively selected the Server rule template, a user may interact with that particular rule by engaging one of the action buttons 445 (e.g., create template, edit, delete, save as). As their names suggest, a user may create a new template, edit an existing template, delete an existing template, or save a new template (e.g., save as) from any of the enumerated rule templates in the manage rule templates window 415 by engaging one of the respective action buttons 445.

For example, a user may engage the "Edit" action button 445 in order to edit or modify the existing Server rule template. Assume, for instance, that the user edits the Server rule template by modifying the scope of the Server rule, resulting in a modified version of the Server rule. The user can then save the modified Server rule as a new rule for use by the compliance manager 150 by engaging the "Save As" action button 445 (e.g., and provide a new name for the rule if necessary). In another embodiment, the user can utilize the modified Server rule to create a new template by engaging the "Create Template" action button 445. By doing so, the new template will be included in the manage rule templates window 415 as a pre-existing rule selectively available to a user of the compliance manager 150 and graphical user interface 135.

The rule preview window 430 provides details of the highlighted rule so that a user can become familiar with a particular rule. In other words, the rule preview window 430 provides details (e.g., rule preview details 435 in FIG. 4) of the rule which has been tentatively selected in the manage rule template window 415, such as the Server rule template shown in FIG. 4. When a user tentatively selects a different rule template in the manage rule templates window 415, the compliance manager 150 displays respective details of the different rule in the rule preview window 430.

Note that rule templates are available for user selection while a user is currently creating, editing, modifying, etc. a policy template as discussed above in reference to FIG. 2.

Figure 5:
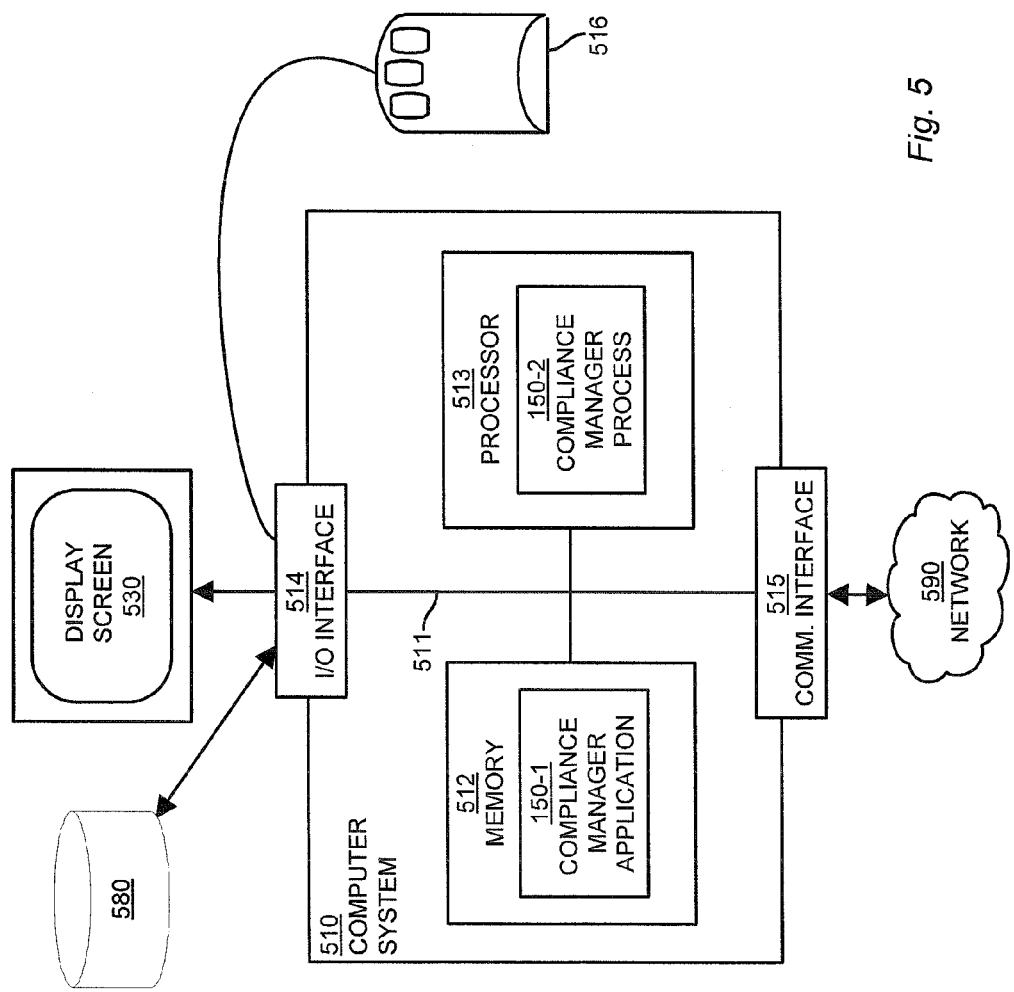
FIG. 5 is an example block diagram of a processing device suitable for executing a respective compliance manager according to embodiments herein.

FIG. 5 is a block diagram illustrating an example computer system 510 for executing compliance manager 150 and related functions/processes according to embodiments herein. Computer system 510 may be a computerized device such as a personal computer, workstation, portable computing device, console, network terminal, processing device, etc.

As shown, computer system 510 of the present example includes an interconnect 511 that couples a memory system 512, a processor 513, an I/O interface 514, and a communications interface 515. I/O interface 514 enables computer system 510 to access repository 580 and display a graphical user interface on display screen 530. An input device 516 (e.g., one or more user/developer controlled devices such as a pointing device, keyboard, mouse, etc.) couples to processor 513 through I/O interface 514, and enables a user to provide input commands and generally control the graphical user interface (e.g., graphical user interfaces 135 as shown in FIG. 1) that the compliance manager application 150-1 and compliance manager process 150-2 provides for display on display 530. Communications interface 515 of computer system 510 enables computer system 510 to communicate over network 590 to transmit and receive information from different resources.

As shown, memory system 512 is encoded with compliance manager application 150-1 supporting generation of graphical user interface and other functions according to embodiments herein. Compliance manager application 150-1 can be embodied as software code such as data and/or logic instructions (e.g., code stored in the memory or on another computer readable medium such as a disk) that support functionality according to different embodiments described herein.

During operation of compliance manager application 150-1, processor 513 accesses memory system 512 via the interconnect 511 in order to launch, run, execute, interpret or otherwise perform the logic instructions of the compliance manager application 150-1. Execution of the compliance manager application 150-1 produces processing functionality in compliance manager process 150-2. In other words, the compliance manager process 150-2 represents one or more portions of the compliance manager application 150-1 (or the entire application) performing within or upon the processor 513 in the computer system 510.

It should be noted that compliance manager process 150-2 executed in computer system 510 can be represented by either one or both of the compliance manager application 150-1 and/or the compliance manager process 150-2. For purposes of this discussion and different embodiments herein, general reference will again be made to the compliance manager process 150-2 as performing or supporting the various steps and functional operations as previously discussed and as will be discussed further in this specification.

As mentioned, in addition to the compliance manager process 150-2, embodiments herein include the compliance manager application 150-1 itself (i.e., the un-executed or non-performing logic instructions and/or data). The compliance manager application 150-1 may be stored on a computer readable medium such as a floppy disk, hard disk, or optical medium. The compliance manager application 150-1 may also be stored in a memory type system such as in firmware, read only memory (ROM), or, as in this example, as executable code within the memory system 512 (e.g., within Random Access Memory or RAM). In addition to these embodiments, it should also be noted that other embodiments herein include the execution of compliance manager application 150-1 in processor 513 as the compliance manager process 150-2. Thus, those skilled in the art will understand that the computer system 510 may include other processes and/or software and hardware components, such as an operating system that controls allocation and use of hardware resources.

Functionality supported by compliance manager 150 and other resources will now be discussed via flowcharts in FIG. 6-9.

Figure 6:
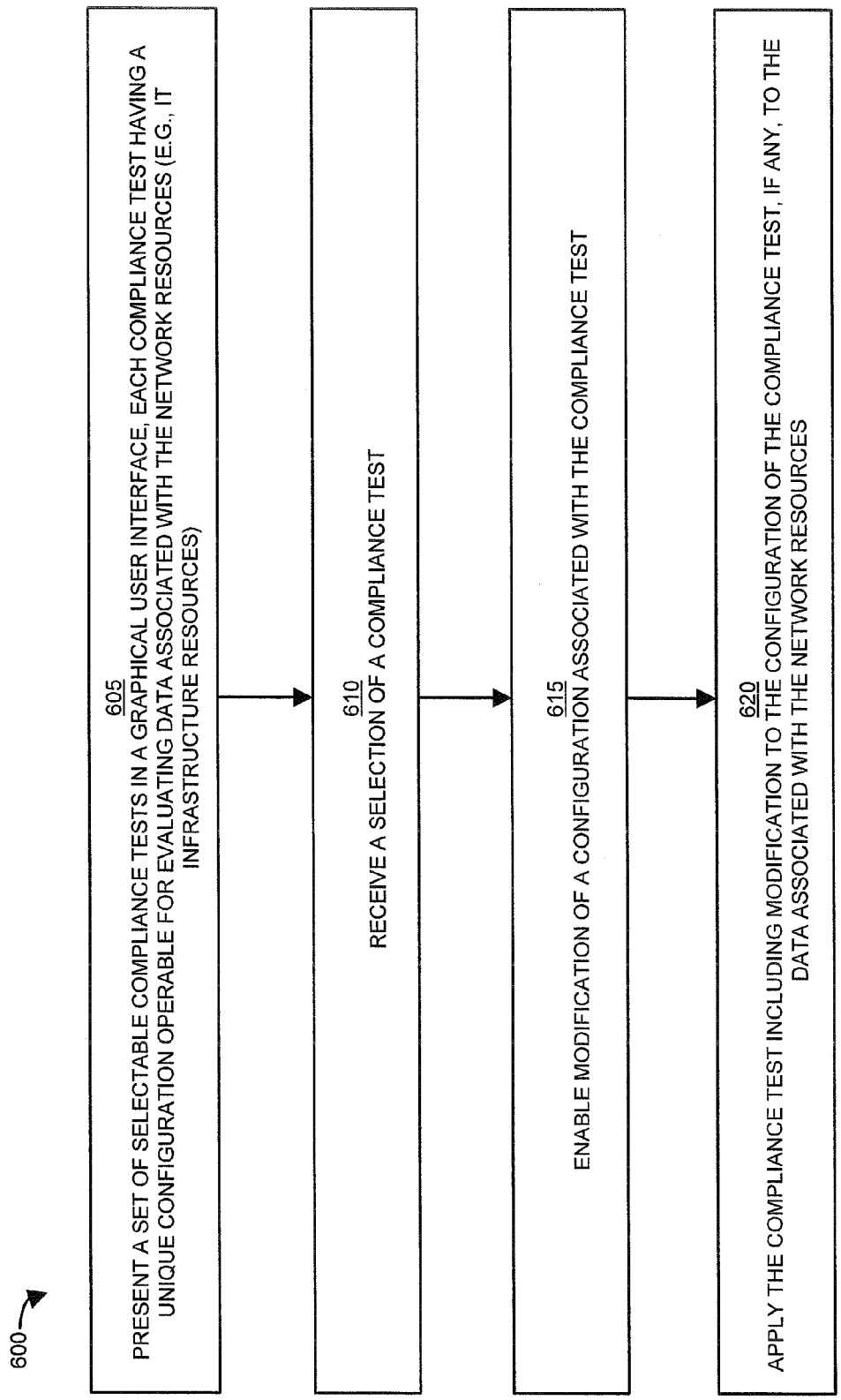
FIGS. 6-9 each represent an example flowchart illustrating a technique associated with management of policies and/or rules according to embodiments herein.

Now, more particularly, FIG. 6 is a flowchart 600 illustrating a technique of enabling management of compliance policies and corresponding rules according to embodiments herein. Note that techniques discussed in flowchart 600 overlap with the techniques discussed above.

In step 605, the compliance manager process 150-2 presents a set of selectable compliance tests (e.g., policy or rule templates) in a graphical user interface 135. In this manner, each compliance test has a unique configuration operable for evaluating data associated with the network (e.g., IT infrastructure) resources. Note that network resources can include hosts, services and connections, wherein the hosts are operable to execute applications, the services are provided by the applications, and the connections are operable to communicate between the applications.

In step 610, the compliance manager process 150-2 receives a selection of a compliance test (e.g., receive a selection of a policy template or a rule template).

In step 615, the compliance manager process 150-2 enables modification of a configuration associated with the compliance test.

In step 620, the compliance manager process 150-2 applies the compliance test including modification to the configuration of the compliance test, if any, to the data associated with the network resources (e.g., resource data).

Figure 7:
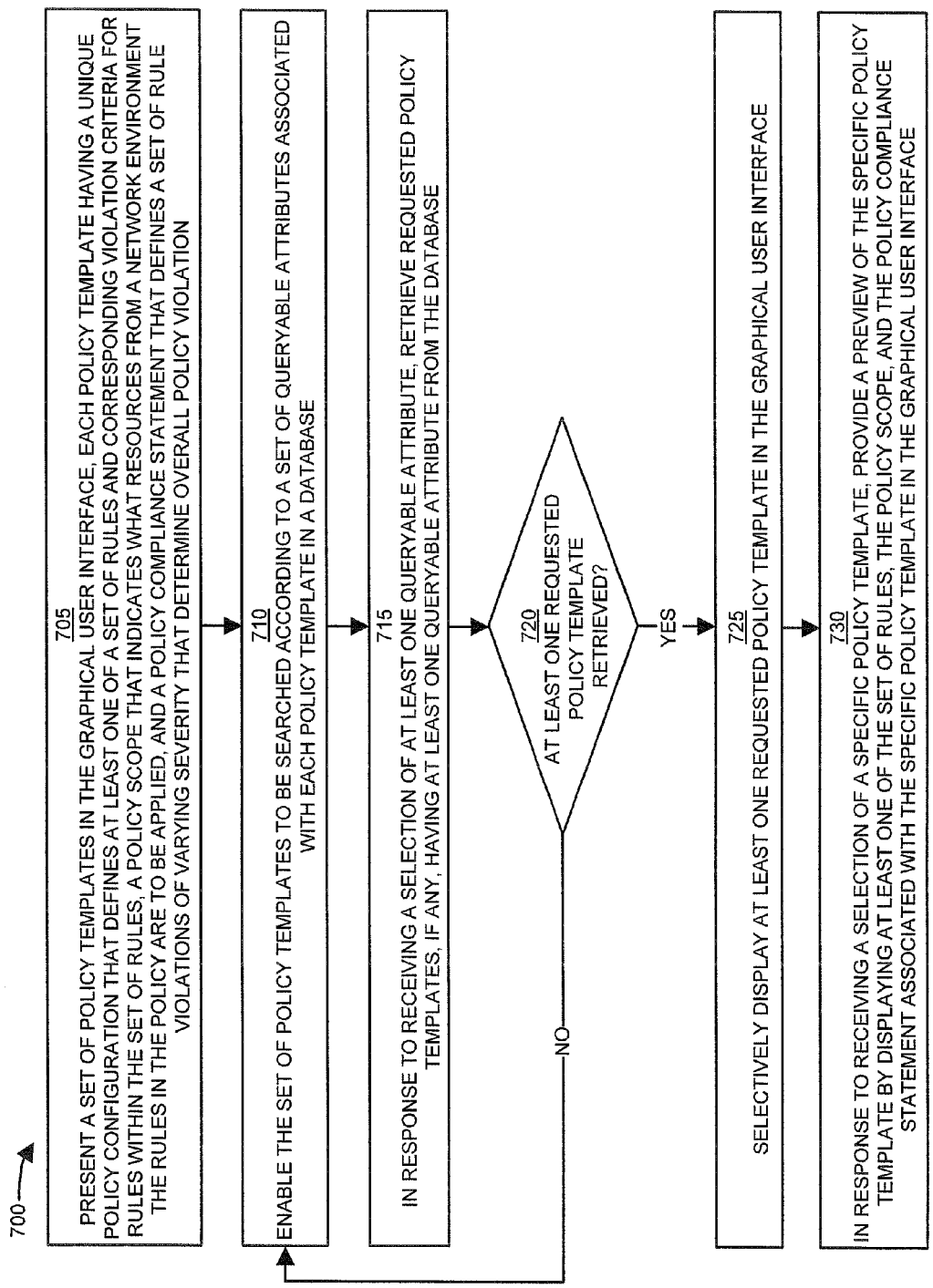

FIG. 7 is a flowchart 700 illustrating a technique of enabling management of compliance policies and corresponding rules according to embodiments herein. Note that techniques discussed in flowchart 700 overlap with the techniques discussed above.

In step 705, the compliance manager process 150-2 presents a set of policy templates in the graphical user interface 135. According to an example embodiment, each policy template has a unique policy configuration that defines at least one of: i) a set of rules and corresponding violation criteria for rules within the set of rules; ii) a policy scope that indicates what resources from a network environment (e.g., IT infrastructure) the rules in the policy are to be applied; and iii) a policy compliance statement that defines a set of rule violations of varying severity that determine overall policy violation.

In step 710, the compliance manager process 150-2 enables the set of policy templates to be searched according to a set of queryable attributes associated with each policy template in a database. A queryable attribute defines a searchable parameter associated with each policy and is operable to identify a respective policy when specified by a user and then retrieved by the compliance manager process 150-2.

In step 715, in response to receiving a selection of at least one queryable attribute, the compliance manager process 150-2 retrieves, from the database, requested policy templates, if any, having the queryable attribute. Queryable attributes (e.g., searchable parameters) can include, but are not limited to, a policy name, a policy scope, a policy creation date, etc.

In step 720, the compliance manager process 150-2 determines if any of the requested policy templates are retrievable. In other words, the compliance manager process 150-2 determines whether any of the available policy templates have attributes that match the queryable attribute specified by the user. For example, if the results of the query are null, then the compliance manager process 150-2 notifies the user and provides the user with an opportunity to re-enter search criteria (e.g., queryable attributes) in order to perform another policy template search (e.g., return to step 710).

In step 725, if policy templates having the requisite queryable attribute(s) are retrieved, the compliance manager process 150-2 then selectively displays the requested policy template(s) in the graphical user interface 135.

In step 730, in response to receiving a selection of a specific policy template, the compliance manager process 150-2 provides a preview of the specific policy template by displaying at least one of: i) the set of rules; ii) the policy scope; and iii) the policy compliance statement, each associated with the specific policy template, in the graphical user interface. For example, the compliance manager process 150-2 provides a preview by displaying the policy scope and policy compliance statement of the HIPAA policy template in the policy preview window 235 in FIG. 2 (represented more particularly in FIG. 3).

Figure 8:
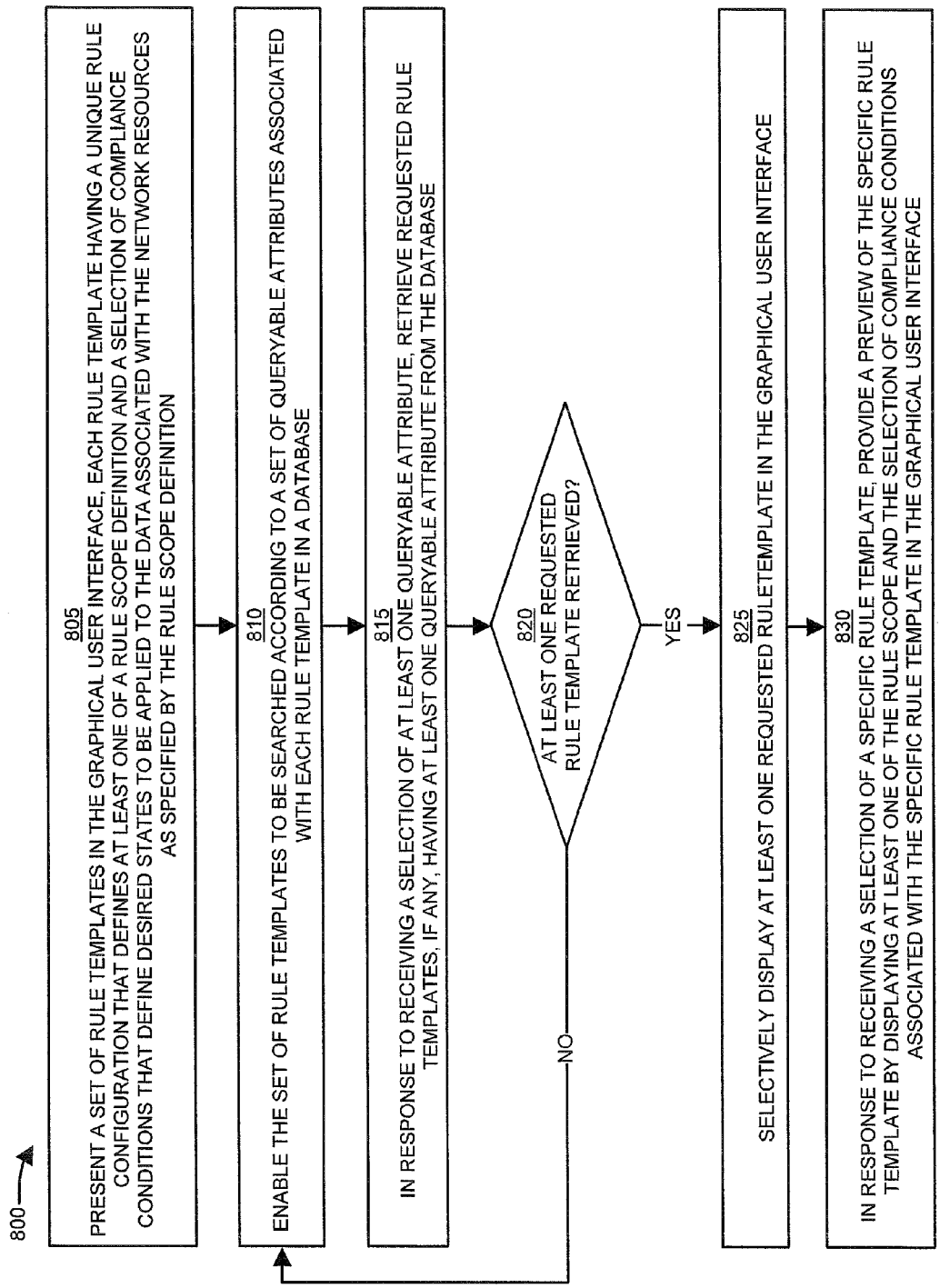

FIG. 8 is a flowchart 800 illustrating a technique of enabling management of compliance policies and corresponding rules according to embodiments herein. Note that techniques discussed in flowchart 800 overlap with the techniques discussed above.

In step 805, the compliance manager process 150-2 presents a set of rule templates in the graphical user interface 135. Accordingly, each rule template has a unique rule configuration that defines at least one of: i) a rule scope definition; and ii) a selection of compliance conditions that define desired states to be applied to the data associated with the network resources (e.g., IT infrastructure resources) as specified by the rule scope definition.

In step 810, the compliance manager process 150-2 enables the set of rule templates to be searched according to a set of queryable attributes associated with each rule template in a database. In this particular embodiment, a queryable attribute defines a searchable parameter associated with each rule and is operable to identify a respective rule when specified by a user and then retrieved by the compliance manager process 150-2.

In step 815, in response to receiving a selection of at least one queryable attribute, the compliance manager process 150-2 retrieves, from the database, requested rule templates, if any, having the queryable attribute. For example, queryable attributes (e.g., searchable parameters) can include, but are not limited to, a rule name, a rule scope, a rule severity, a rule creation date, etc.

In step 820, the compliance manager process 150-2 determines if any of the requested rule templates are retrievable. In other words, the compliance manager process 150-2 determines whether any of the available rule templates have attributes that match the queryable attribute specified by the user. For example, if the results of the query are null, then the compliance manager process 150-2 notifies the user and provides the user with an opportunity to re-enter search criteria (e.g., queryable attributes) in order to perform another rule template search (e.g., return to step 810).

In step 825, if rule templates having the requisite queryable attribute(s) are retrieved, the compliance manager process 150-2 then selectively displays the requested rule template(s) in the graphical user interface 135.

In step 830, in response to receiving a selection of a specific rule template, the compliance manager process 150-2 provides a preview of the specific rule template by displaying at least one of: i) the rule scope; and ii) the selection of compliance conditions associated with the specific rule template in the graphical user interface.

Figure 9:
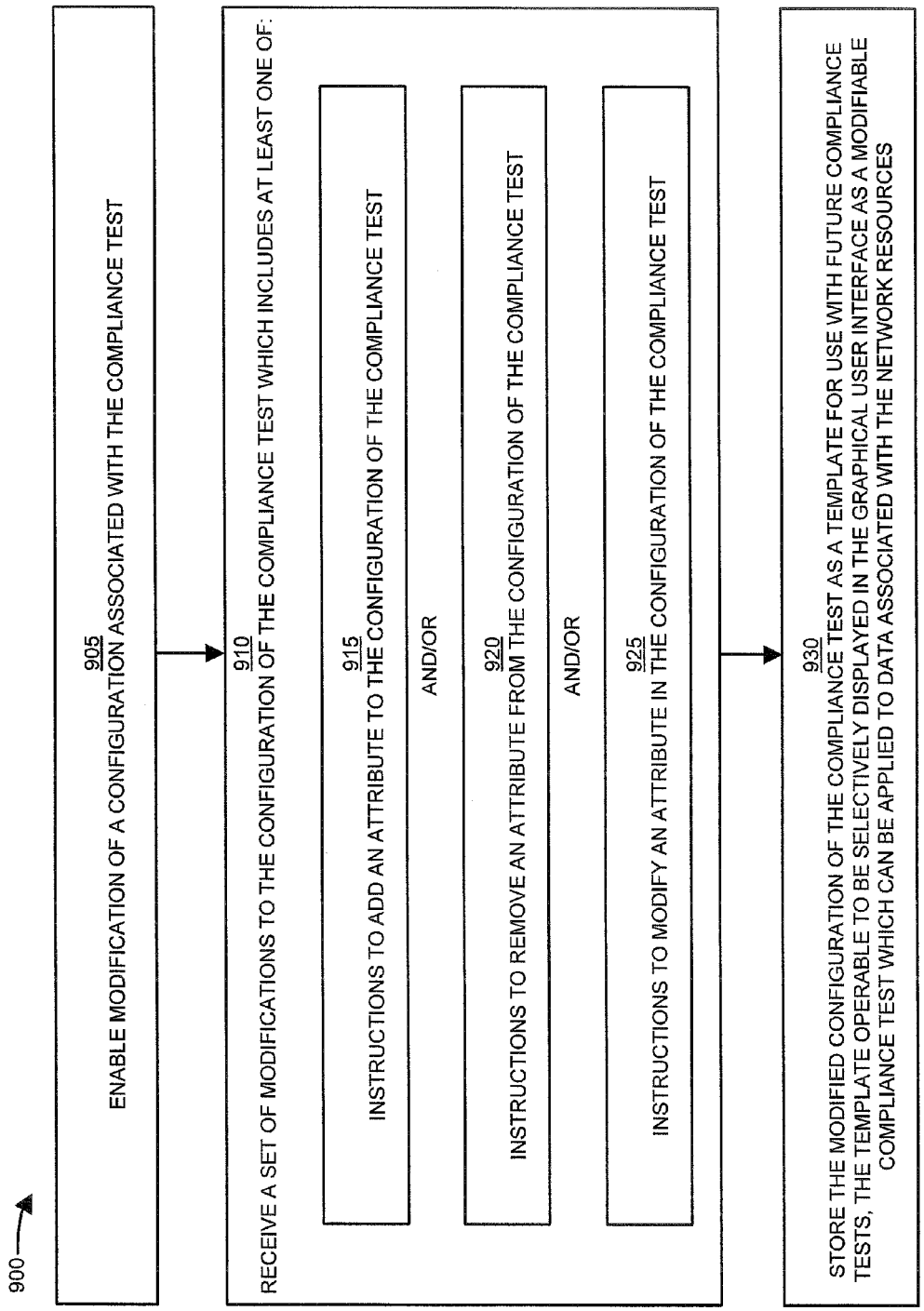

FIG. 9 is a flowchart 900 illustrating a technique of enabling management of compliance policies and corresponding rules according to embodiments herein. Note that techniques discussed in flowchart 900 overlap with the techniques discussed above.

In step 905, the compliance manager process 150-2 enables modification of a configuration associated with the compliance test. According to an example embodiment, in response to receiving a selection of a policy template, the compliance manager process 150-2 enables modification of the policy template by presenting a set of rule templates in the graphical user interface (as previously discussed in step 805).

In step 910, the compliance manager process 150-2 receives a set of modifications to the configuration of the compliance test.

In step 915, the compliance manager process 150-2 adds an attribute to the configuration of the compliance test in accordance with the received set of modifications.

In step 920, the compliance manager process 150-2 removes an attribute from the configuration of the compliance test in accordance with the received set of modifications.

In step 925, the compliance manager process 150-2 modifies an attribute in the configuration of the compliance test in accordance with the received set of modifications.

In step 930, the compliance manager process 150-2 stores the modified configuration of the compliance test as a template for use with future compliance tests. As an example, the template can be selectively displayed in graphical user interface as a modifiable compliance test which can be applied to data associated with the network resources (e.g., IT infrastructure resources).

As discussed above, techniques herein are well suited for use in network environments in which policies and rules are applied to test for compliancy. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A computer-implemented method for performing compliance testing of Information Technology (IT) infrastructure resources, the method comprising:
presenting a set of compliance test templates in a graphical user interface of a computer for selection of one or more of the compliance test templates by a user of the computer, each compliance test template having a unique configuration operable for creating compliance tests and evaluating data associated with the IT infrastructure resources including hosts operable to execute applications, services provided by the applications, and connections operable to communicate between the applications, comprising:
presenting a set of policy templates in the graphical user interface, each policy template having a unique policy configuration that defines at least one of a set of rules and corresponding violation criteria for rules within the set of rules, a policy scope that indicates what resources from an IT infrastructure the set of rules in the policy template is to be applied, and a policy compliance statement that defines a set of rule violations of varying severity that determine overall policy violation;
receiving a selection of a compliance test template from a user of the computer prior to creation of a compliance test using the selected compliance test template, comprising receiving a selection of a policy template;
enabling modification of a configuration associated with the selected compliance test template prior to creation of a compliance test using the selected compliance test template, comprising:
presenting a set of rule templates in the graphical user interface, each rule template having a unique rule configuration that defines at least one of a rule scope definition and a selection of compliance conditions that define desired states to be applied to the data associated with the IT infrastructure resources as specified by the rule scope definition;
creating the compliance test using the selected compliance test template according to the modification to the configuration the associated with the selected compliance test template; and
applying the created compliance test to the data associated with the IT infrastructure resources.

2. The computer-implemented method as in claim 1 further comprising:
enabling the set of policy templates to be searched according to a set of queryable attributes associated with each policy template in a database;
in response to receiving a selection of at least one queryable attribute, retrieving requested policy templates, if any, having the at least one queryable attribute from the database; and
if at least one requested policy template is retrieved, selectively displaying the at least one requested policy template in the graphical user interface.

3. The computer-implemented method of claim 2, wherein receiving a selection of at least one queryable attribute includes receiving at least one of a policy name, a policy scope, and a policy creation date.

4. The computer-implemented method as in claim 1 further comprising:
in response to receiving a selection of a specific policy template, providing a preview of the specific policy template by displaying at least one of the set of rules, the policy scope, and the policy compliance statement associated with the specific policy template in the graphical user interface.

5. The computer-implemented method as in claim 1 further comprising:
enabling the set of rule templates to be searched according to a set of queryable attributes associated with each rule template in a database;
in response to receiving a selection of at least one queryable attribute, retrieving requested rule templates, if any, having the at least one queryable attribute from the database; and
if at least one requested rule template is retrieved, selectively displaying the at least one requested rule template in the graphical user interface.

6. The computer-implemented method as in claim 5, wherein receiving a selection of at least one queryable attribute includes receiving at least one of a rule name, a rule scope, a rule severity, and a rule creation date.

7. The computer-implemented method as in claim 1 further comprising:
in response to receiving a selection of a specific rule template, providing a preview of the specific rule template by displaying at least one of the rule scope and the selection of compliance conditions associated with the specific rule template in the graphical user interface.

8. The computer-implemented method as in claim 1 further comprising:
receiving a set of modifications to the configuration of the selected compliance test template; and
storing the modified configuration of the compliance test template as a new compliance test template for use with future compliance tests, the new compliance test template operable to be selectively displayed in the graphical user interface as a modifiable compliance test template which can be applied to data associated with the IT infrastructure resources.

9. The computer-implemented method as in claim 8, wherein receiving a set of modifications to the configuration of the compliance test template includes at least one of:
adding an attribute to the configuration of the compliance test template;
removing an attribute from the configuration of the compliance test template; and
modifying an attribute in the configuration of the compliance test template.

10. A computer system comprising:
a processor;
memory that stores instructions associated with a compliance test template management application for execution by the processor; and
an interconnect coupling the processor and the memory, enabling a computer system to execute the compliance test template management application and perform operations of:
presenting a set of compliance test templates in a graphical user interface for selection of one or more of the compliance test templates by a user, each compliance test having a unique configuration operable for developing compliance tests and evaluating data associated with Information Technology (IT) infrastructure resources including hosts operable to execute applications, services provided by the applications, and connections operable to communicate between the applications, comprising:

presenting a set of policy templates in the graphical user interface, each policy template having a unique policy configuration that defines at least one of a set of rules and corresponding violation criteria for rules within the set of rules, a policy scope that indicates what resources from an IT infrastructure the set of rules in the policy template is to be applied, and a policy compliance statement that defines a set of rule violations of varying severity that determine overall policy violation;

receiving a selection of a compliance test template prior to creation of a compliance test using the selected compliance test template, comprising receiving a selection of a policy template;

enabling modification of a configuration associated with the selected compliance test template prior to creation of a compliance test using the selected compliance test template, comprising:

presenting a set of rule templates in the graphical user interface, each rule template having a unique rule configuration that defines at least one of a rule scope definition and a selection of compliance conditions that define desired states to be applied to the data associated with the IT infrastructure resources as specified by the rule scope definition;

creating the compliance test using the selected compliance test template according to the modification to the configuration the associated with the selected compliance test template; and applying the created compliance test to the data associated with the IT infrastructure resources.

11. The computer system as in claim 10 wherein execution of the compliance test template management application further causes the computer system to perform operations of:

receiving a set of modifications to the configuration of the selected compliance test template including at least one of:

adding an attribute to the configuration of the compliance test template;

removing an attribute from the configuration of the compliance test template; and modifying an attribute in the configuration of the compliance test template; and storing the modified configuration of the compliance test template as a new compliance test template for use with future compliance tests, the new compliance test template operable to be selectively displayed in the graphical user interface as a modifiable compliance test template which can be applied to data associated with the IT infrastructure resources.

12. The computer system as in claim 10 wherein execution of the compliance test template management application further causes the computer system to perform operations of:

enabling the set of policy templates to be searched according to a set of queryable attributes associated with each policy template in a database;

in response to receiving a selection of at least one queryable attribute, retrieving requested policy templates, if any, having the at least one queryable attribute from the database; and if at least one requested policy template is retrieved, selectively displaying the at least one requested policy template in the graphical user interface.

13. The computer system as in claim 10 wherein execution of the compliance test template management application further causes the computer system to perform operations of:

enabling the set of rule templates to be searched according to a set of queryable attributes associated with each rule template in a database;

in response to receiving a selection of at least one queryable attribute, retrieving requested rule templates, if any, having the at least one queryable attribute from the database; and if at least one requested rule template is retrieved, selectively displaying the at least one requested rule template in the graphical user interface.

14. The computer system as in claim 10 wherein execution of the compliance test template management application further causes the computer system to perform operations of:

receiving a set of modifications to the configuration of the selected compliance test template; and storing the modified configuration of the compliance test template as a new compliance test template for use with future compliance tests, the new compliance test template operable to be selectively displayed in the graphical user interface as a modifiable compliance test template which can be applied to data associated with the IT infrastructure resources.

15. A computer program product having a non-transitory computer readable storage medium operable to store computer program logic embodied in computer program code encoded as a set of processor based instructions thereon for compliance testing of Information Technology (IT) infrastructure resources comprising:

computer program code for presenting a set of compliance test templates in a graphical user interface for selection of one or more of the compliance test templates by a user, each compliance test having a unique configuration operable for developing compliance tests and evaluating data associated with the IT infrastructure resources including hosts operable to execute applications, services provided by the applications, and connections operable to communicate between the applications, comprising:

computer program code for presenting a set of policy templates in the graphical user interface, each policy template having a unique policy configuration that defines at least one of a set of rules and corresponding violation criteria for rules within the set of rules, a policy scope that indicates what resources from an IT infrastructure the set of rules in the policy template is to be applied, and a policy compliance statement that defines a set of rule violations of varying severity that determine overall policy violation;

computer program code for receiving a selection of a compliance test template prior to creation of a compliance test using the selected compliance test template, comprising computer program code for receiving a selection of a policy template;

computer program code for enabling modification of a configuration associated with the selected compliance test prior to creation of a compliance test using the selected compliance test template, comprising:

computer program code for presenting a set of rule templates in the graphical user interface, each rule template having a unique rule configuration that defines at least one of a rule scope definition and a selection of compliance conditions that define desired states to be applied to the data associated with the IT infrastructure resources as specified by the rule scope definition;

computer program code for creating a the compliance test using the selected compliance test template according to the modification to the configuration of the associated with the selected compliance test template; and computer program code for applying the created compliance test to the data associated with the IT infrastructure resources.

16. The computer program product as in claim 15, wherein the computer program code for presenting a set of selectable compliance test templates in a graphical user interface comprises:

computer program code for, in response to receiving a selection of a specific policy template, providing a preview of the specific policy template by displaying at least one of the set of rules, the policy scope, and the policy compliance statement associated with the specific policy template in the graphical user interface.

17. The computer program product as in claim 15, wherein the computer program code for presenting a set of selectable compliance test templates in a graphical user interface comprises:

computer program code for, in response to receiving a selection of a specific rule template, providing a preview of the specific rule template by displaying at least one of the rule scope and the selection of compliance conditions associated with the specific rule template in the graphical user interface.

18. The computer program product as in claim 15 further comprising:

computer program code for enabling the set of policy templates to be searched according to a set of queryable attributes associated with each policy template in a database;

computer program code for, in response to receiving a selection of at least one queryable attribute, retrieving requested policy templates, if any, having the at least one queryable attribute from the database; and computer program code for, if at least one requested policy template is retrieved, selectively displaying the at least one requested policy template in the graphical user interface.

19. The computer program product as in claim 15 further comprising:

computer program code for enabling the set of rule templates to be searched according to a set of queryable attributes associated with each rule template in a database;

computer program code for, in response to receiving a selection of at least one queryable attribute, retrieving requested rule templates, if any, having the at least one queryable attribute from the database; and computer program code for, if at least one requested rule template is retrieved, selectively displaying the at least one requested rule template in the graphical user interface.

20. The computer program product as in claim 15 further comprising:

computer program code for receiving a set of modifications to the configuration of the selected compliance test template; and computer program code for storing the modified configuration of the compliance test template as a new compliance test template for use with future compliance tests, the new compliance test template operable to be selectively displayed in the graphical user interface as a modifiable compliance test template which can be applied to data associated with the IT infrastructure resources.

* * * * *